(12) United States Patent
Browne et al.

(10) Patent No.: US 8,336,912 B2
(45) Date of Patent: Dec. 25, 2012

(54) SYSTEMS FOR AND METHODS OF FACILITATING A LATERAL MANEUVER BY A VEHICLE

(75) Inventors: Alan L. Browne, Grosse Pointe, MI (US); Christopher E. Borroni-Bird, Oakland Township, MI (US); Mark A. Kramarczyk, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 443 days.

(21) Appl. No.: 12/577,196

(22) Filed: Oct. 11, 2009

(65) Prior Publication Data
US 2011/0083921 A1 Apr. 14, 2011

(51) Int. Cl.
*B60S 9/14* (2006.01)
(52) U.S. Cl. .......................... 280/761; 180/199; 301/5.23
(58) Field of Classification Search .................. 180/199, 180/200, 201; 280/761, 766.1; 152/216, 152/518, 519; 301/5.1, 5.23, 36.3, 40.6
See application file for complete search history.

(56) References Cited

U.S. PATENT DOCUMENTS

| | | | | | |
|---|---|---|---|---|---|
| 2,460,178 | A | * | 1/1949 | Kember | 180/209 |
| 2,478,653 | A | * | 8/1949 | Callan | 280/767 |
| 2,765,199 | A | * | 10/1956 | Partin | 301/47 |
| 3,029,886 | A | * | 4/1962 | Hansen | 180/200 |
| 3,039,551 | A | * | 6/1962 | Podger | 180/15 |
| D318,791 | S | * | 8/1991 | Guile | D8/375 |
| 5,323,867 | A | * | 6/1994 | Griffin et al. | 180/22 |
| 6,022,082 | A | * | 2/2000 | O'Brien | 301/45 |
| 6,183,010 | B1 | * | 2/2001 | Daoud | 280/766.1 |
| 6,357,834 | B1 | * | 3/2002 | Bowman et al. | 301/124.1 |
| 7,730,978 | B2 | * | 6/2010 | Dixon | 180/7.1 |

* cited by examiner

*Primary Examiner* — Anne Marie M Boehler

(57) ABSTRACT

A system for and method of facilitating or enabling a lateral maneuver by a vehicle, including and utilizing a plurality of selectively engaged low friction components, such as rollers, bearings, balls, or high durometer high abrasion resistant low loss modulus rubber treads, and an actuator, such as at least one inflatable bladder, pivotal support strut, or active material element, drivenly coupled to the components.

5 Claims, 5 Drawing Sheets

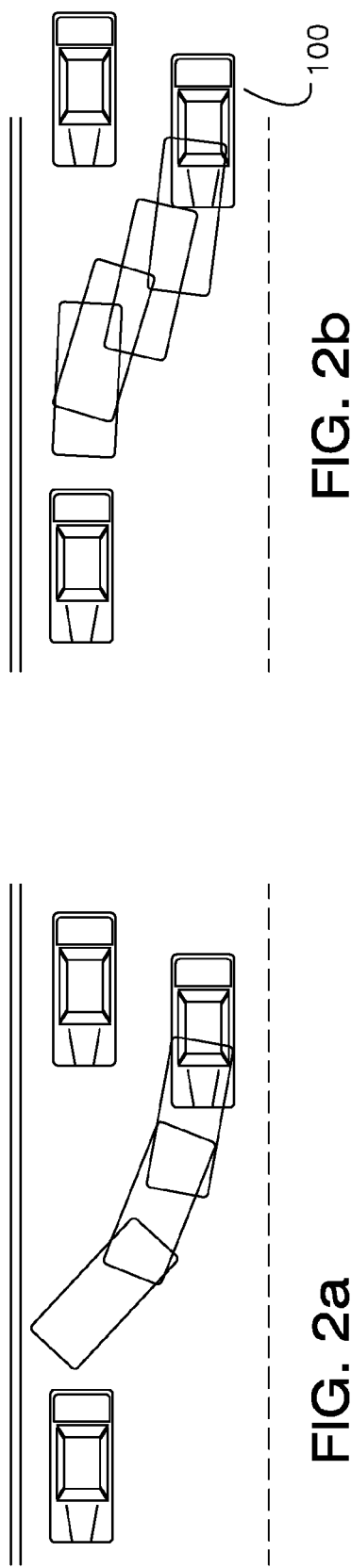
FIG. 2a
FIG. 2b
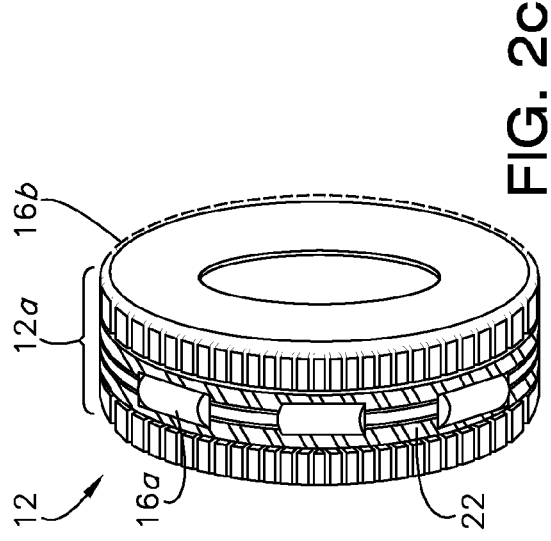
FIG. 2c
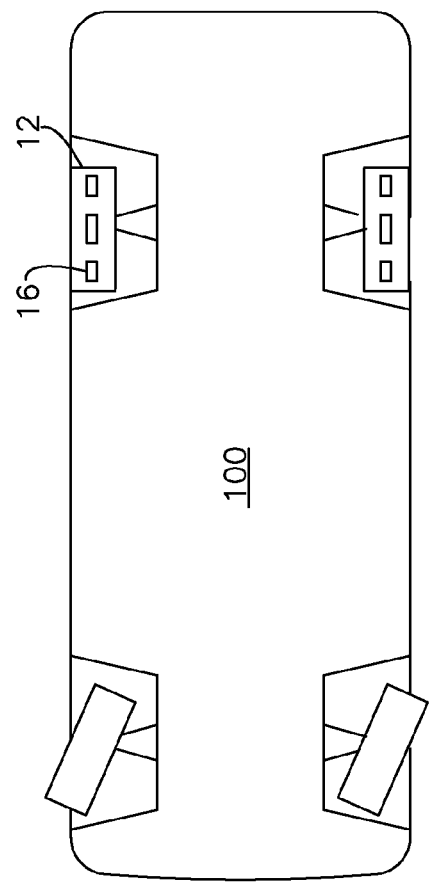
FIG. 2

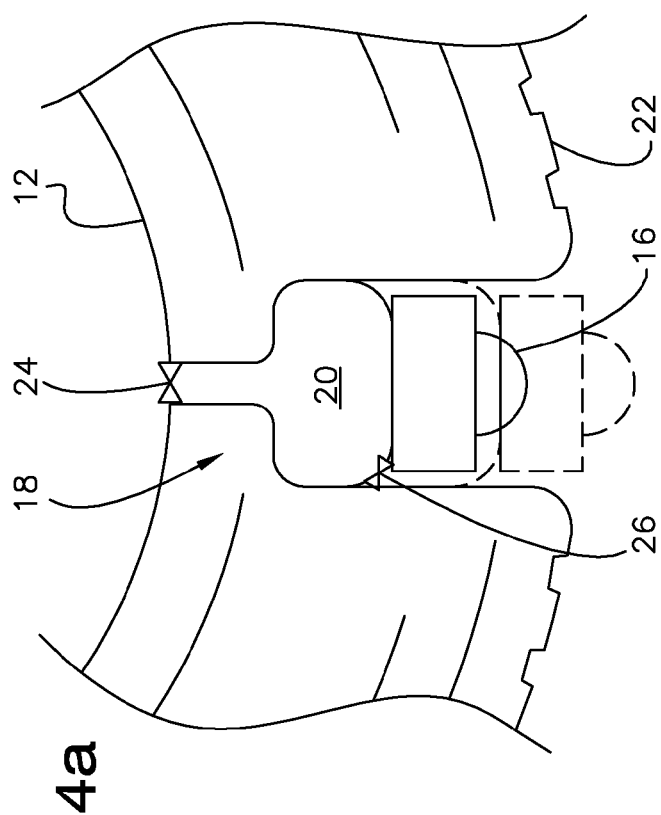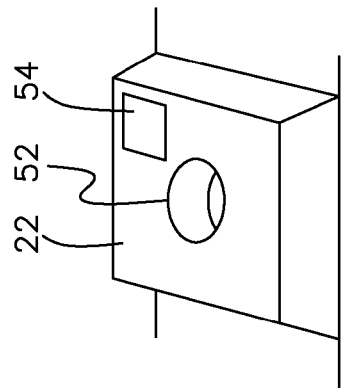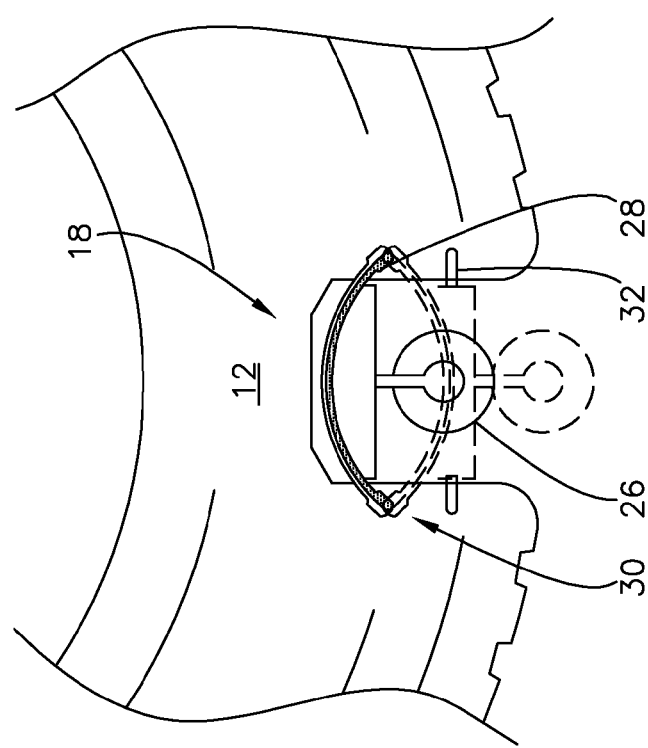

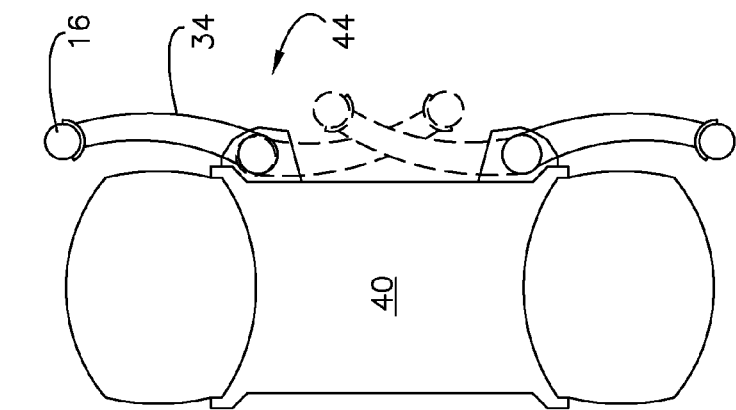
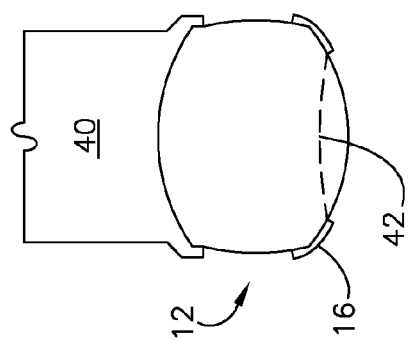
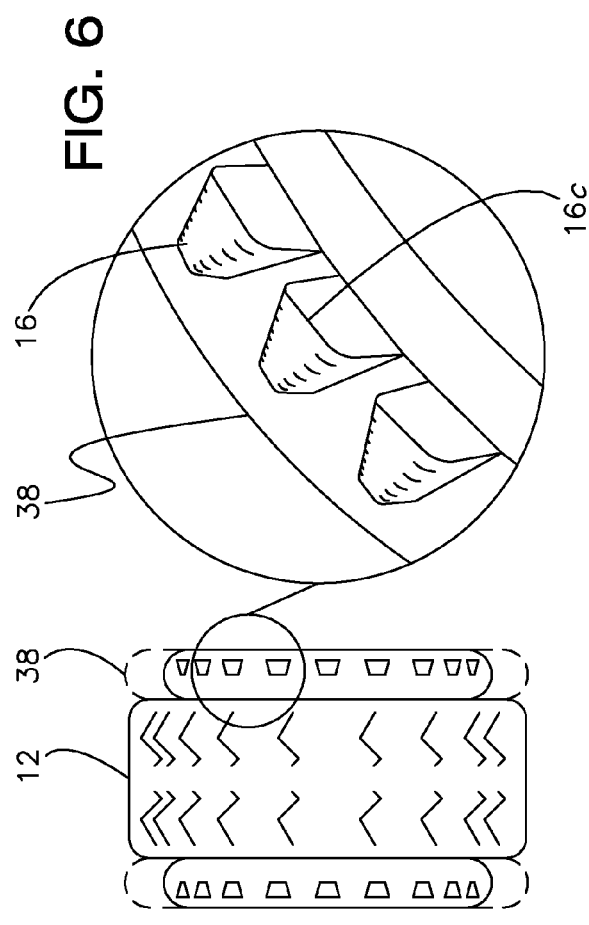
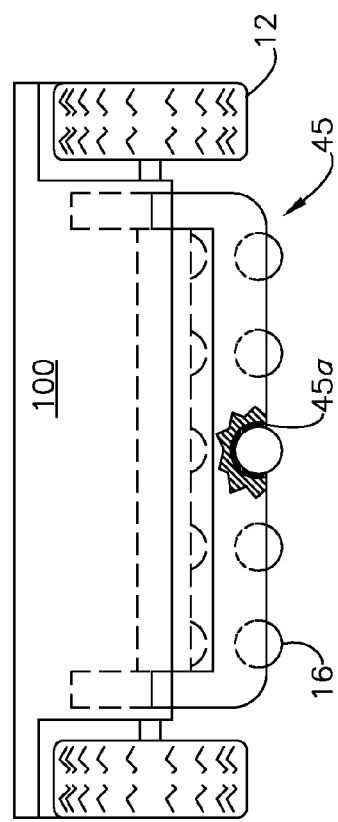

SYSTEMS FOR AND METHODS OF FACILITATING A LATERAL MANEUVER BY A VEHICLE

BACKGROUND OF THE INVENTION

1. Technical Field

This disclosure generally relates to turning, control, and drive-train systems in roadway vehicles; and more particularly, to a mechanical system adapted for facilitating a lateral maneuver, such as the type performed during parallel parking/unparking, or enabling direct lateral travel by the vehicle.

2. Background Art

Automotive vehicles have long used various mechanical systems such as front wheel steering to control the direction of travel. More particularly, steering columns comprising a rack and pinion have traditionally been used to turn a front pair of laterally spaced tires/wheels that engage the ground (i.e., roadway, surface, etc.). For operable performance, these traditional systems require proper construction and maintenance, including a maximum tire toe in/toe out spatial relationship. Concernedly, and with respect to the present invention, these systems are primarily designed for longitudinal travel, and often produce excessive acoustical emission and tire wear during a lateral maneuver, due to sliding friction. Moreover, traditional systems are unable to effect direct lateral travel, irrespective of proper construction and maintenance.

Rigid Mecanum and omni-directional wheels have been introduced in other applications (e.g., wheel chairs, factory equipment, etc.) that directly enable travel in a lateral direction; however, these systems are limited to low-speed applications and dramatically affect the regular longitudinal ride and handling characteristics of the applied machines. As such, Mecanum and omni-directional wheels have achieved limited application in the automotive arts.

BRIEF SUMMARY

In response to the afore-mentioned concerns, the invention presents a selectively engaged mechanical system that facilitates a lateral maneuver or enables direct lateral travel by a vehicle when engaged, and allows regular longitudinal travel when disengaged. In a preferred embodiment, the system includes a plurality of low friction components that are selectively caused to engage the ground and operable to reduce the net sliding friction force defined by the vehicle tires and surface. In another embodiment, a plurality of rollers distends from the vehicle (e.g., chassis, wheel, etc.) and selectively engages the surface to facilitate the maneuver or effect direct lateral travel. An actuator, including, for example, at least one inflatable bladder, pivotal support strut, or active material element, is drivenly coupled to each component and operable to cause the component to selectively achieve the engaged condition.

Thus, among other things, the invention is useful for facilitating and/or causing a vehicle to perform a lateral maneuver, such as with respect to parallel parking, without generating excessive crabbing of the wheels, acoustical emissions, or tire wear. The invention is further useful for providing a solution readily implemented by pre-existing vehicles without requiring significant redesign of the chassis or suspension system, altering packaging requirements related to maximum toe-in/toe-out, or significantly impacting stability, vehicle ride, braking and handling characteristics.

Other aspects and advantages of the present invention will be apparent from the following detailed description of the preferred embodiment(s) and accompanying drawing figures.

BRIEF DESCRIPTION OF THE SEVERAL VIEWS OF THE DRAWING

A preferred embodiment of the invention is described in detail below with references to the attached drawing figures of exemplary scale, wherein:

FIG. 2 is a bottom view of a vehicle including a mechanical system comprising low friction components disposed within the tread wall of the rear tires, in accordance with a preferred embodiment of the invention;

FIG. 2a is a schematic progression of a traditional lateral maneuver performed by a prior art vehicle;

FIG. 2b is a schematic progression of a lateral maneuver being performed by the vehicle shown in FIG. 2;

FIG. 2c is a perspective view of a tire having a plurality of selectively engageable rollers disposed within the treadwall, in accordance with a preferred embodiment of the invention;

FIG. 4a is an elevation of a section of a tire presenting an external surface, and particularly illustrating a discrete bladder and a low friction component drivenly coupled thereto, in accordance with a preferred embodiment of the invention;

FIG. 4b is an elevation of a section of a tire particularly illustrating a bowed active material element and a low friction component drivenly coupled thereto, in accordance with a preferred embodiment of the invention;

FIG. 5 is a perspective view of a tire tread defining an orifice operable to convey a pressurized fluid, in accordance with a preferred embodiment of the invention;

FIG. 6 is a front elevation of a tire comprising laterally adjacent bladders, each presenting a plurality of low friction trapezoidal treads particularly illustrated in enlarged caption view, in accordance with a preferred embodiment of the invention;

FIG. 7 is a cross-sectional elevation of a tire and wheel having a plurality of distendable rollers pivotally attached to the wheel, in accordance with a preferred embodiment of the invention;

FIG. 7a is a partial elevation of a vehicle having a distendable bar retaining plural balls, in accordance with a preferred embodiment of the invention; and FIG. 8 is a partial cross-section of a tire presenting a tread face comprising low loss high modulus tread elements along the lateral edges of the tread wall, and defining a camber within the tread wall, so as to cause the tread elements to contact the ground when the system is engaged, in accordance with a preferred embodiment of the invention.

DETAILED DESCRIPTION OF THE PREFERRED EMBODIMENTS

In general, the present invention concerns a mechanical system 10 adapted for use with an automotive vehicle 100 (FIG. 1), such as a car or truck that rides upon the ground, e.g., pavement, roadway, or otherwise riding surface. The inventive system 10 is generally suited for facilitating or directly enabling a lateral maneuver, such as a parking/unparking maneuver or when navigating congested areas.

Figure 1:
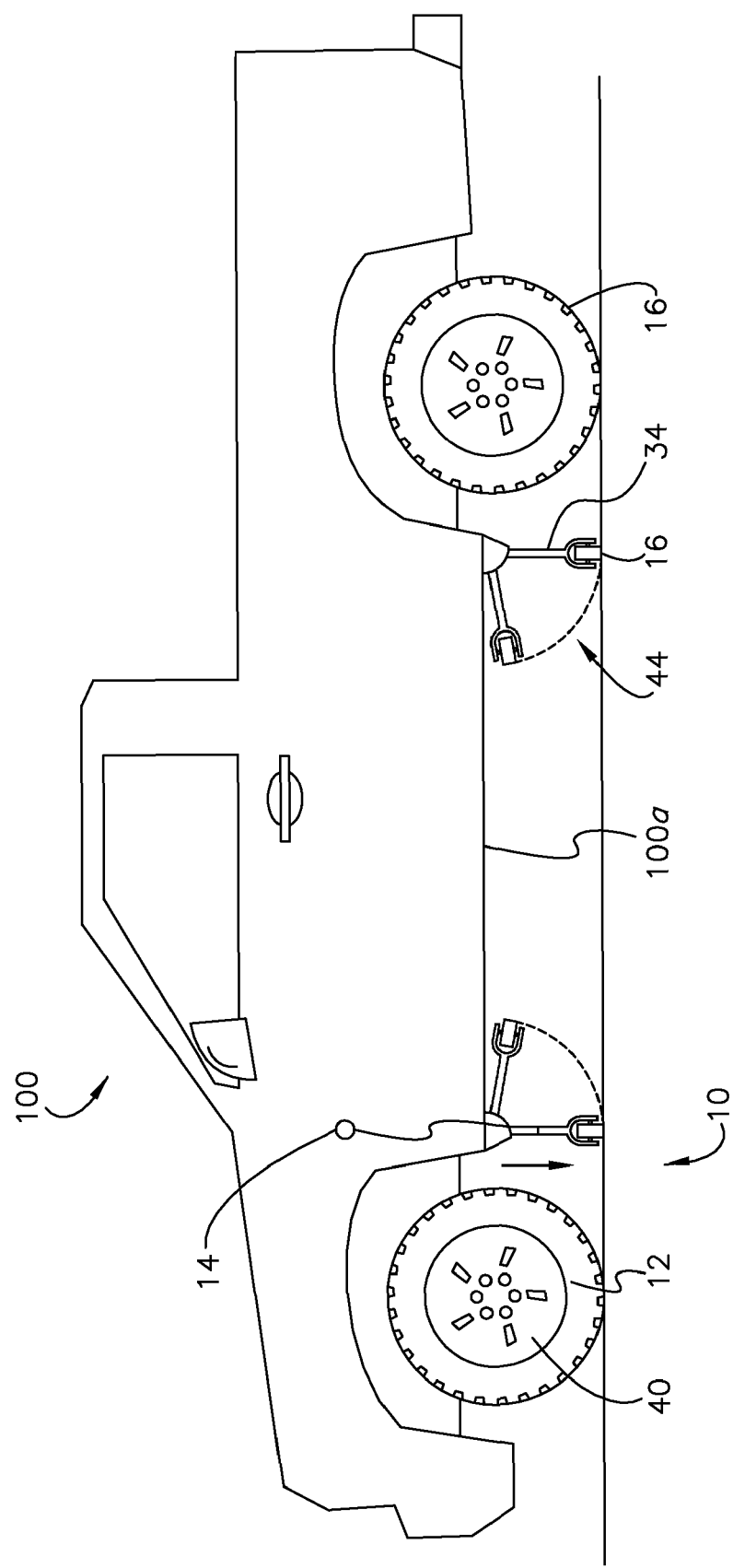
FIG. 1 is an elevation view of a mechanical system comprising a plurality of distending wheels shiftably coupled to a vehicle and a plurality of tires including laterally exterior low loss high modulus treads, in accordance with a preferred embodiment of the invention.

Various tire and vehicle-based approaches are proposed herein, with the understanding that the proposed embodiments are merely exemplary in nature and are in no way intended to limit the invention, its application, or uses. For example, it is appreciated that the benefits and advantages of the inventive system 10 may be employed in non-automotive applications, and with non-inflated (e.g., disk) tires/wheels. More particularly, FIGS. 1-6, and 8 present tire-based approaches, wherein the tires 12 need to be turned no more than typical front wheel steering allows. It is appreciated that vehicles 100 with front wheel steering only may need slight rear wheel well modification to allow sufficient wheel toe in/toe out. FIGS. 1 and 7 present vehicle-based approaches.

The vehicle 100 may feature a singular engine and drive train (not shown), or independent drives and steering for each tire 12. Further, power could be split and/or reversed from the engine using appropriate gearing and differentials (not shown). Where necessary, a designated motorized, hydraulic, pneumatic, or otherwise powered device (also not shown) could be used to turn the tires 12 to a desired "toe in/toe out" relative condition, just prior to engaging the system 10.

When the system 10 is engaged, it is intended that the vehicle 100 is prepared to perform or actually performing the lateral maneuver. As such, the preferred system 10 is communicatively coupled to at least one sensor 14 operable to detect an imminent or current lateral maneuver. For example, a steering wheel angle sensor, speedometer, gyro, lateral acceleration sensor, or vision system may be used either singular or in combination to determine the later maneuver. Alternatively, an input device may be triggered by an operator to provide on-demand engagement.

In a first aspect of the invention, the system 10 includes a plurality of low friction components 16 operable to collectively facilitate a lateral maneuver by the vehicle 100, and to permit typical road or highway travel when not in use. To that end, the preferred system 10 is configured such that the low friction components 16 are completely stowed away when the system 10 is disengaged. The type of locomotion achieved when engaged depends on the type and location of the low friction components 16.

There are essentially two types of low friction components 16, rolling 16a, and sliding 16b (FIG. 2c). Where the components 16 roll and are disposed within the tires 12, the resultant lateral motion is based on the sum of the angles of the tires 12 still in contact with the ground, the angle of the rolling components 16, and the rotation speed of the tires 12. In contrast, low friction material components 16 slide over the ground, such that the locomotion is achieved by the angle and rotation speed of the tires 12. The sum of the angles of the tires 12 and the rolling components 16 when the system 10 is engaged is preferably 30 to 40°, more preferably, 40 to 45°, and most preferably, 45°. Where rolling/driven rollers 16 are mounted to the vehicle 100 (as shown in FIG. 1), the rollers 16 preferably face and roll in the direction of travel.

The low friction components 16 may be rotatable, and more preferably omni-directionally rotatable, and selected from a group consisting essentially of wheels, rollers, bearings, balls, and the like (FIGS. 1, 2, 2c, 3, 4a,b, and 6); or fixed, such as a tread element made of a low friction material (FIGS. 1, 2c, 5, and 8), and more preferably, a high durometer high abrasion resistant low loss modulus rubber, or Teflon®. As further described herein, the rolling components 16 may be directly embedded or mounted on the tread wall 12a of the tires 12, or the vehicle (e.g., wheel, chassis, etc.) itself.

The system 10 includes an actuator 18 drivenly coupled to the components 16 and operable to cause the components 16 to extend and more preferably extend and retract, so as to engage and disengage the ground, respectively. In FIG. 4a, for example, the actuator 18 comprises at least one and more preferably an array of discrete bladders 20 fluidly coupled to the internal pressure of the associated tire 12, or an external pressure source (not shown). Where a valve is caused to open, the pressure or source is operable to extend the low friction components 16, as shown in hidden-line type in FIG. 4a. The discrete bladders 20 are preferably made of flexible rubber and disposed between otherwise conventional treads 22 of the tire 12. More preferably, a piezo-controlled inlet valve 24 may fluidly interconnect the internal air pressure of the tire 12 and each bladder 20; and a piezo-controlled outlet valve 26 may fluidly couple the interior space defined by the bladder 20 and ambient air external to the tire 12 (FIG. 4a).

FIG. 4b shows a similar tire-based embodiment in which embedded roller components 16 may be extended and preferably locked by activation of at least one active material element 28 drivenly coupled thereto. In the exemplary embodiment shown, for example, a bowed shape memory alloy element 28 composing a preferably bi-stable strip 30 is mounted behind a roller 16. The roller 16 defines an axis of rotation preferably perpendicular to the axis of rotation of the tire 12. Heating the element 28 causes the strip 30 to bow outwardly and the roller 16 to be extended past the tread wall 12a. It is anticipated that in most modes of operation, the system 10 will be engaged for periods less than five minutes. As such, it is appreciated that activation of the element 24 may be maintained by continuously delivering a maintenance signal, periodically delivering an activation signal, or where thermally activated, by providing insulation sufficient to slow cooling.

More preferably, however, the element 24, when activated, further triggers a locking mechanism (e.g., an engageable pin) 32 that holds the roller 16 in the extended position (FIG. 4b). Cooling the element 24 enables a separate (SMA-based) actuator (not shown) to be activated, thereby releasing the locking mechanism (e.g., pulling the pin) 32 and enabling the drop in modulus and interface forces to retract the roller 16. Other active materials suitable for use in this configuration include ferromagnetic shape memory alloys, electroactive polymers, magnetorheological elastomers, electrorheological elastomers, and piezoelectric materials, as understood and defined by those of ordinary skill in the art.

FIGS. 2a,b show exemplary progressions of a lateral maneuver being performed by a conventional vehicle, and a vehicle 100 having engaged traverse rollers, or more preferably, omni-directional components (e.g., balls, low friction tread elements, etc.) employed at the rear tires 12, respectively. As shown, in the latter scenario, the rear tires 12, more particularly illustrated at FIG. 2c, are able to slide laterally, thereby facilitating the parking maneuver.

In other examples, the actuator 18 includes extendable support struts 34 (FIGS. 1, 6), an inflatable annular bladder 36 (FIG. 3), or at least one laterally adjacent bladder 38 (FIG. 5). The support struts 34 are preferably telescoping and made of a high strength, light weight metal, such as titanium. The struts 34 may be interiorly disposed within the tire 12, or otherwise connected to the vehicle chassis 100*a* (FIG. 1) or wheel 40 (FIG. 7). Variations include hinges, pre-loaded springs, and other retractable load bearing members. Once in place, the struts 34 or other members can be extended pneumatically or hydraulically, for example.

FIG. 6 shows a system 10 comprising low friction treads 16 at the edges of the radially external surface of inflatable outer bladders 38 laterally adjacent the tire 12. As illustrated, the low friction treads (or "ribs") 16 may be trapezoidal in shape, and preferably present rounded leading and trailing edges, and a base 16*c* that extends along the outboard side. That is to say, the trapezoidal treads are oriented such that the largest edge faces away from the middle of the tire 12. In a preferred mode of operation, when lateral maneuver assist is desired, only the bladder 38 opposite the direction of travel is inflated so that the low friction treads 32 associated therewith come in primary contact with the ground.

Similarly, low friction material components 16 may be presented at or near the edges of the tread wall 12*a*, and configured such that they do not make significant contact with the ground under normal operation (i.e., when the system 10 is disengaged). In another embodiment, when lateral maneuver assist is desired, the tire 12 is caused to achieve a camber 42 (FIG. 8), which in turn cause the low friction treads 16 to come in contact with the ground. More preferably, the camber 42 is configured such that only the treads 16 on the side of the tire 12 facing the direction of lateral travel are caused to come in contact with the ground.

Alternatively, the vehicle 100 may be caused to tilt in the direction of lateral travel through activation of the suspension system (not shown) or an auxiliary pneumatic, hydraulic, or the like system (also not shown), so that the high stiffness low loss modulus treads 16 along the edge closest to the direction of travel come into primary contact with the ground. For example, the system 10 may comprise pressurized air bellows on either side of the vehicle 100, similar to ride height adjusters, wherein a pressurization differential between the air bellows causes the vehicle 100 to tilt in the direction of lateral travel.

In the vehicle-mounted embodiment of FIG. 7, at least one roller 16 is pivotally connected to the wheels 40 via support struts 34. The strut/roller outrigger 44 is preferably coupled to the inboard side of the wheel 40 and configured to contact the ground when fully distended. The struts 34 preferably present an arcuate longitudinal profile for added structural capacity. When the system 10 is disengaged, the struts 34 are folded inward relative to the central axis of the wheel 40. Pre-loaded springs, telescoping struts, or other extendable load bearing members are preferably used to lift the wheel 40, so as to leave only the rollers 12 in contact with the ground; or the tire 12 may be deflated. With respect to the latter, the tires 12 may be deflated by opening the air valve, and then inflated by a designated compressor or pump when the system 10 is disengaged. In another mode, the tires 12 may present a first alignment, and lifted to a second alignment such that only the rollers 12 come in contact with the ground. The lifting may be caused by activation of the suspension system, such as through hydraulics or pneumatics. It is appreciated that the rollers 12 may be powered, and pivotal about a vertical axis to present a swivel action that facilitates travel.

Similarly, a strut/roller outrigger 44 may be mounted to the vehicle 100. In this configuration, the components 16, preferably rollers, may be rotatably coupled to support arms/struts 34 that are translatably connected to the vehicle chassis 100*a* (FIGS. 1 and 7). The rollers 12 are preferably oriented in the lateral direction. The support struts 34 may be folded up against the chassis 100*a* when the system 10 is disengaged, so as to be stowed away, and caused to extend towards the ground, and locked in place, when the system 10 is engaged.

In a preferred embodiment, the swing arms 18 and vehicle 100 are cooperatively configured such that the swing struts 34 are able to swing down to a deployed orientation without contacting the ground; the struts 34 are then caused to telescope or otherwise extend until contacting the ground, and attempt to further extend, so as to exert a lifting force upon the vehicle 100 and tires 12. This lifts the tires off the ground, so that only the rollers 16 contact the ground. Alternatively, it is appreciated that the tires 12 may be deflated so that they lose contact with the ground, in addition to or lieu of exerting the lifting force. At least one of the fore and aft pair of rollers 12 is preferably driven, so as to cause or aid the lateral maneuver. Finally, in yet another embodiment, it is appreciated that a laterally spanning bar 45, retaining at least one rolling component 16, e.g., ball, swiveled roller, etc., may be (e.g., hydraulically) caused to distend from and lift the vehicle 100, preferably near the rear axle. Where balls 16 are used (FIG. 7*a*), a solid lubricant or otherwise frictionless material 45*a* is preferably disposed between the balls 16 and bar 45.

Figure 3C:
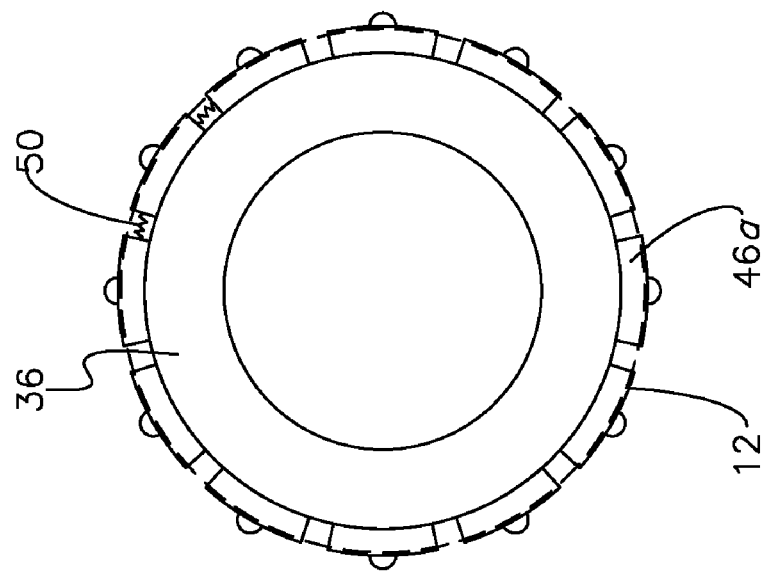
FIG. 3c is a side elevation of the tire shown in FIGS. 3a,b, wherein the band and components are in an extended/engaged condition.
Figure 3B:
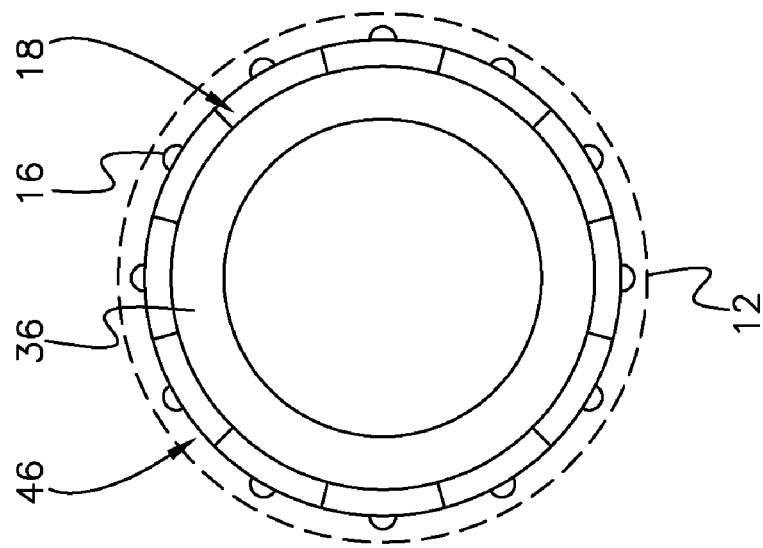
FIG. 3b is a side elevation of the tire shown in FIG. 3a, wherein the band and components are in a retracted/disengaged condition.
Figure 3A:
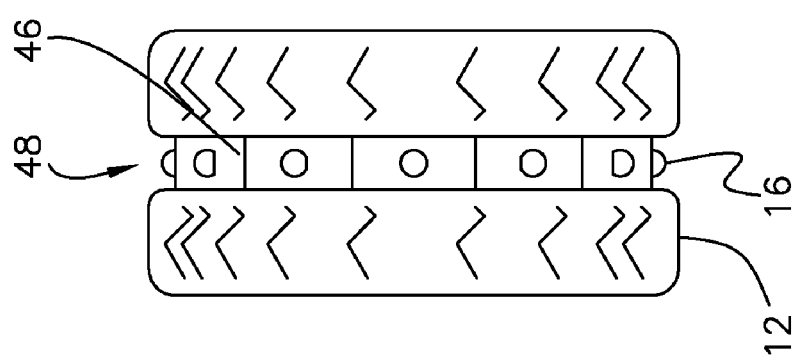
FIG. 3a is a front elevation of a tire defining a channel, and disposed therein an annular expandable bladder, and a band of low friction components drivenly coupled to the bladder, in accordance with a preferred embodiment of the invention.

In FIGS. 3*a-c*, the low friction components 16 are embedded within or disposed upon an extendable band 46. More particularly, a tire 12 defining a channel 48 (or an internal region defined by two separate inflatable units) large enough to partially enclose and space the extendable band 46 from the ground is presented. As shown in FIG. 3*a*, a singular channel 48 is preferably defined in the middle of the tread wall 12*a*, but a plurality of channels 48 could also divide the tire 12 into two symmetric sections. The band 46 may be segmented as shown in FIG. 3*b*. A torous or annular shaped tube/bladder 36 may be drivenly coupled to the band 46 and configured to cause low friction components 16 secured thereupon to be extended past and retracted within the tread wall 12*a*, when inflated and deflated, respectively (compare FIGS. 3*b* and 3*c*). That is to say, the annular bladder 36 is fluidly coupled to a pressurized air supply (not shown) and selectively inflated. Alternatively, the components 16 may be driven by mechanical support struts 34 interiorly disposed within the tire 12 and/or wheel 40. Finally, it is appreciated that the segmented band sections 46*a* may be interconnected by extension springs 50, so as to bias the band 46 towards the retracted/disengaged condition.

In another example shown partially at FIG. 5, otherwise conventional tires treads 22 define orifices 52 through which pressurized air is released towards the ground. The air is preferably released when the orifice 52 makes contact with or comes near the ground, so as to provide an air cushion assist that reduces sliding friction. Pressure sensors 54, preferably of piezo-type, detect contact with the ground, and signal a valve (not shown), again preferably a piezo-valve, fluidly coupled to the orifice 52 to open, thereby releasing a short burst of high pressure air. The valve closes when the sensor 54 no longer detects contact between the ground and tread 22. More preferably, the orifices 52 are defined by low friction treads 16, so as to further reduce sliding friction.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

Ranges disclosed herein are inclusive and combinable (e.g. ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g. the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

What is claimed is:

1. A tire-based system adapted for use with a vehicle comprising a plurality of tires and performing a lateral maneuver upon a surface, wherein the tires and surface cooperatively present a net friction force and the maneuver is performed in a first direction, said system comprising:
    at least one low friction component communicatively coupled to at least a portion of the tires, selectively shiftable between engaged and disengaged conditions relative to the surface, and configured to reduce the friction force, when in the engaged condition; and
    an actuator drivenly coupled to said at least one component and operable to cause the component to selectively achieve the engaged condition, when activated, wherein the actuator includes at least one expandable bladder operable to selectively cause said at least one component to be extended and retracted, so as to achieve the engaged and disengaged conditions, respectively, and each tire presents an external surface, a plurality of components are disposed within the surface, and the actuator includes a plurality of discrete bladders, each operable to selectively cause the components to be extended past the surface when inflated.

2. The system in claim 1, wherein the tire defines an internal tire pressure, and piezo-controlled inlet and outlet valves fluidly couple the bladders to the internal tire pressure and ambient air external to the tire.

3. A tire-based system adapted for use with a vehicle comprising a plurality of tires and performing a lateral maneuver upon a surface, wherein the tires and surface cooperatively present a net friction force and the maneuver is performed in a first direction, said system comprising:
    at least one low friction component communicatively coupled to at least a portion of the tires, selectively shiftable between engaged and disengaged conditions relative to the surface, and configured to reduce the friction force, when in the engaged condition; and
    an actuator drivenly coupled to said at least one component and operable to cause the component to selectively achieve the engaged condition, when activated, wherein the actuator comprises at least one active material element drivenly coupled and operable to selectively cause said at least one component to be extended or retracted, and the active material element is selected from the group consisting essentially of shape memory alloys, ferromagnetic shape memory alloys, electroactive polymers, magnetorheological elastomers, electrorheological elastomers, and piezoelectric materials.

4. The system in claim 3, wherein the actuator includes a support strut drivenly coupled to each component and operable to selectively cause the component to be extended and retracted, so as to achieve the engaged and disengaged conditions, respectively.

5. The system in claim 3, wherein the low friction components are selected from the group consisting essentially of wheels, rollers, bearings, balls, and low friction material.

* * * * *